United States Patent [19]

Ingram

[11] 4,179,154
[45] Dec. 18, 1979

[54] AIR VELOCITY RESPONSIVE DEFLECTOR
[75] Inventor: Charles E. Ingram, Warren, Mich.
[73] Assignee: Four Star Corporation, Troy, Mich.
[21] Appl. No.: 848,402
[22] Filed: Nov. 4, 1977
[51] Int. Cl.² .............................................. B60J 1/20
[52] U.S. Cl. ..................................................... 296/91
[58] Field of Search .......................... 296/91, 15, 1 S; 224/42.1 D

[56] References Cited
U.S. PATENT DOCUMENTS 3,089,728   5/1963   Shumaker ........................... 296/15 X
3,330,454   7/1967   Bott ..................................... 296/91 X Primary Examiner—Joseph F. Peters, Jr.
Assistant Examiner—Gene A. Church
Attorney, Agent, or Firm—Basile and Weintraub

[57] ABSTRACT

A luggage carrier or similar vehicle mounted rack has a pivotally moveable air deflector incorporated therewith. The deflector is positionable between a locked position and a freely moveable position. A locking mechanism defined by a biassing assembly moveable within a housing or stanchion to which the deflector blade is pivotally mounted. The locking mechanism engages or disengages the pivotal assembly of the deflector blade to lock it in position or to render it freely between a horizontal and vertical position in response to the velocity of the air impinging thereon.

27 Claims, 8 Drawing Figures

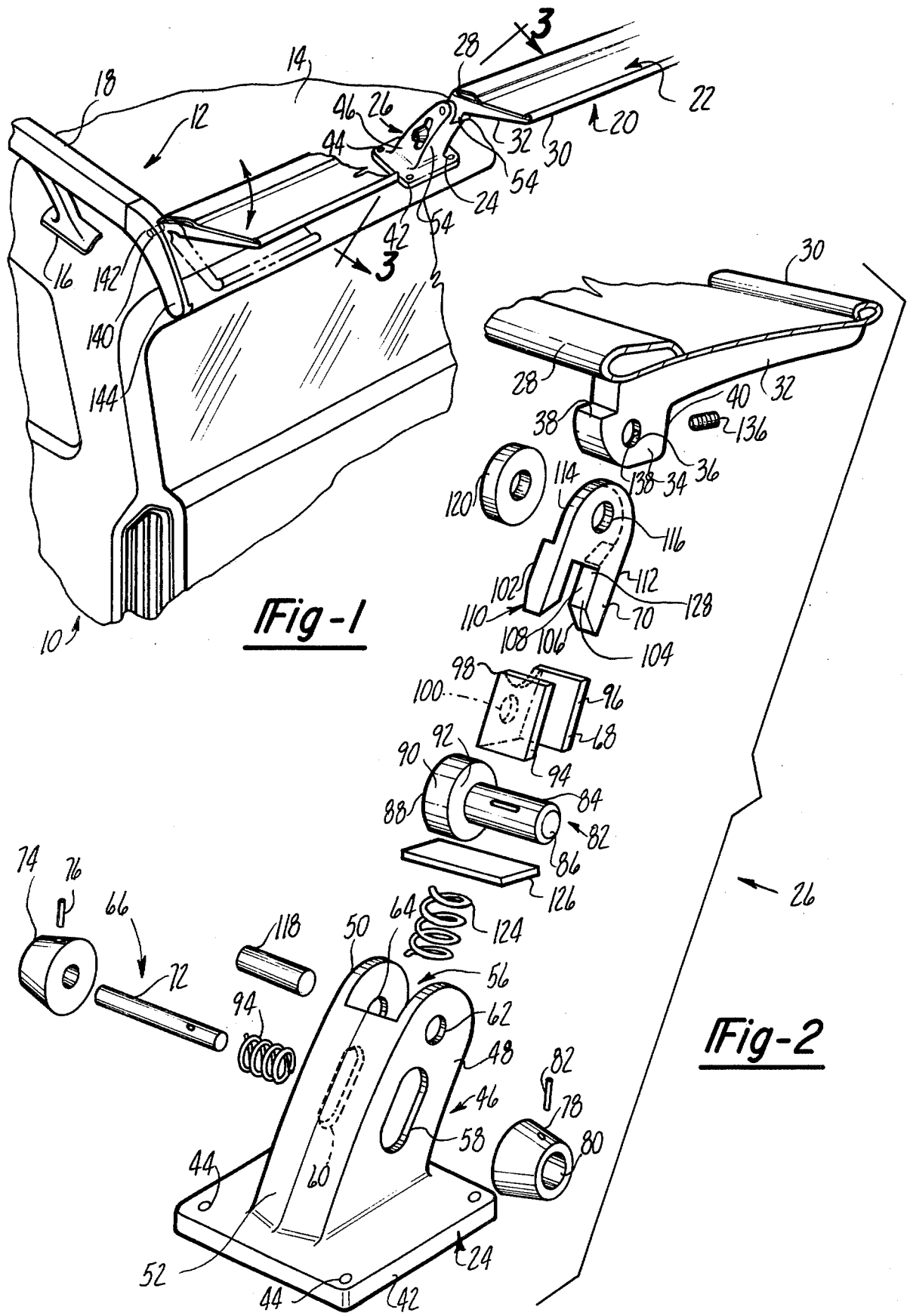

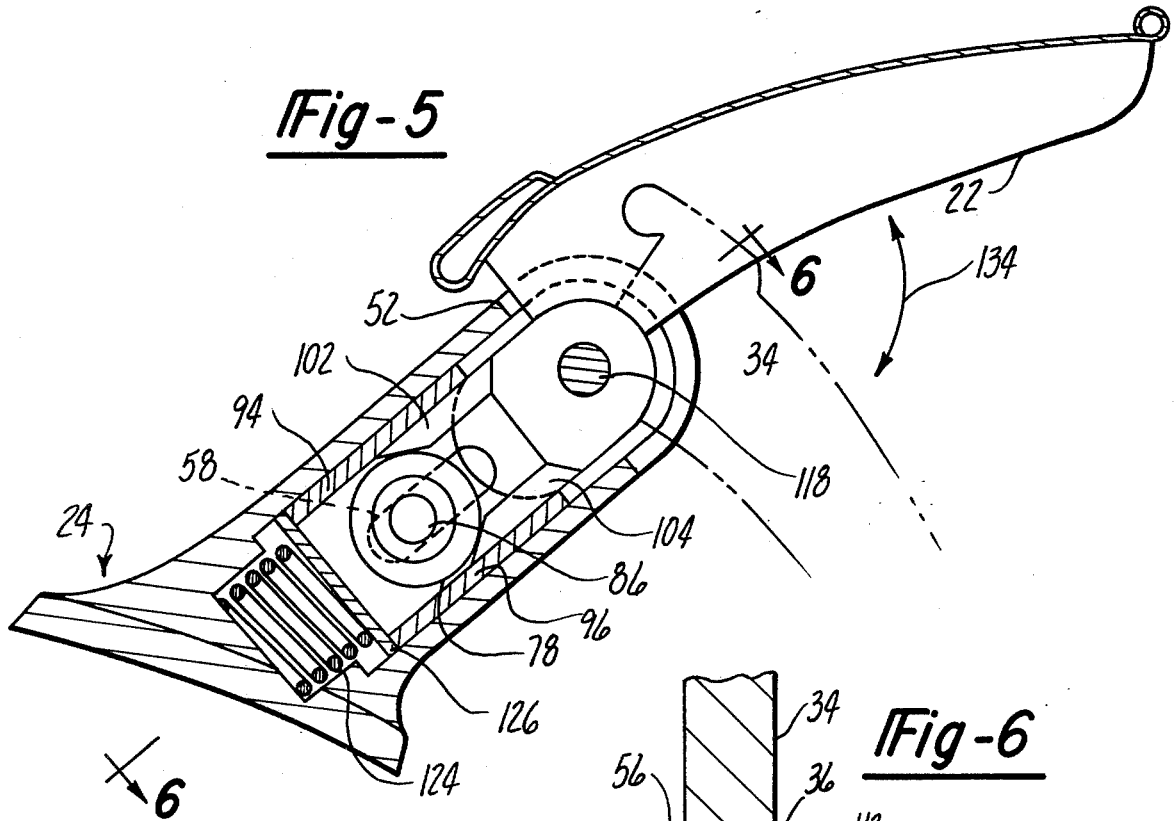
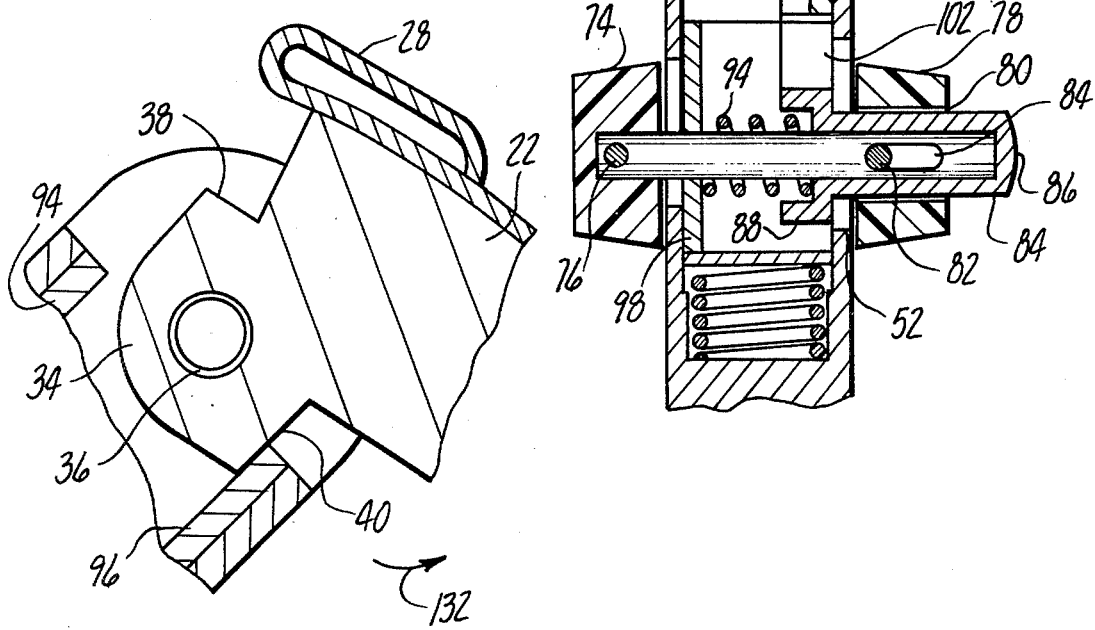

AIR VELOCITY RESPONSIVE DEFLECTOR

BACKGROUND OF THE INVENTION

1. Field of the Invention

The present invention pertains to air deflectors. More particularly, the present invention pertains to air deflectors for vehicle roofs. Even more particularly, the present invention pertains to air deflectors for vehicle roofs which are associated with or mounted to luggage racks or carriers.

2. Prior Art

Vehicle mounted luggage carriers are, of course, well known. The "station wagon" type vehicle as is presently known has such luggage carriers or racks directly mounted on the roof over the passenger compartment. The luggage carriers, generally, include a base upon which the articles to be transported are placed. Longitudinally extending side rails prevent the articles from falling off the rack. The rear enclosing wall of the present known carriers is defined by either a rail having an air deflector associated therewith or an air deflector, alone.

The air deflector is deployed for circulating air down past the rear window of the car to maintain the rear window free from debris such as dust, snow, rain and the like.

The air deflectors, as presently manufactured, are rigid structures which extend in a plane inclined with respect to the roof of the vehicle and overhand the rear door and/or window access. The deflectors are fixedly mounted in such positions. It has been observed that the deflectors, where deployed, create a substantial drag on the vehicle. The drag created necessitates substantial increases in power to move the vehicle. This is quite pronounced at increased vehicle speeds in excess of about thirty miles per hour. This observed increased power requirement, of course, has a direct relationship to the fuel consumption of the vehicle. Thus, it is readily apparent that a major advance in the art would be provided if the problem of "drag" could be alleviated. It will be appreciated that the present invention provides a salient solution to this problem by providing an air deflector which, in one mode, is velocity responsive to rotate between a vertical to horizontal plane.

STATEMENT OF RELEVANT PRIOR ART

To the best of applicant's knowledge, the most relevant art is found in the following U.S. Pat. Nos.: 3,427,067, 2,919,952, 3,368,841, 3,519,178, 3,069,562, 3,596,975 3,097,882, 3,000,663, 3,063,748, 26,538 Reissue, 3,560,044, 3,089,728, 3,090,645, 3,856,193.

To the best of applicant's knowledge, the present invention is the first known pivotally rotatably air deflector for a luggage carrier.

SUMMARY OF THE INVENTION

In accordance with the present invention, there is provided an air deflector for a luggage carrier. The deflector hereof comprises: (a) a deflector blade, (b) a stanchion having the blade pivotally mounted thereonto, and (c) a locking mechanism disposed within the stanchion. The locking mechanism is moveable between the first and second positions to define the operational mode of the deflector.

In a first position the locking mechanism locks the blade in either a horizontal or vertical plane. In the second position, the locking mechanism is out of contact with the blade and, thereby, enables the blade to pivotally rotate between a vertical and horizontal plane in response to the velocity of the air flowing therepast.

In accordance herewith, the stanchion defines a housing having a pair of opposed slots formed therein. A pushbutton assembly is translatable in the slots and actuated exteriorly thereof for moving the locking mechanism between the first and second positions. The first and second positions are defined by the terminus of the slots.

The locking mechanism, per se, comprises a channel member moveable into and out of engagement with the base of the deflector blade. When in engagement with the base, the deflector blade is freely rotatable about the pivot means. The channel member defines a camming lock for the blade base regardless of the blade being in a horizontal or vertical plane. Biasing means maintains the pushbutton assemblies in either the first or second positions. When the channel member is in the locking mode a biasing means is urged against the channel member to maintain the locking mode.

The ends of the deflector blade can be pivotally mounted in stanchions.

The present invention, as noted, provides a luggage carrier having the locking mechanism hereof incorporated therewith.

For a more complete understanding of the present invention, reference is made to the following detailed description and accompanying drawing. In the drawing, like reference characters refer to like parts throughout the several views, in which:

BRIEF DESCRIPTION OF THE DRAWING

FIG. 1 is a broken, perspective view of the rear of a vehicle having a velocity responsive air deflector in accordance with the present invention incorporated therewith;

FIG. 2 is an exploded, perspective view of the locking mechanism or assembly hereof;

FIG. 5 is a view similar to FIG. 3, but showing the deflector blade in a freely pivotable or rotatable mode with the locking mechanism out of engagement therewith;

FIG. 6 is a cross-sectional view taken along line 6—6 of FIG. 5;

FIG. 8 is an enlarged, fragmentary view of a deflector blade locked in a substantially vertical plane.

DESCRIPTION OF THE PREFERRED EMBODIMENT

Figure 3:
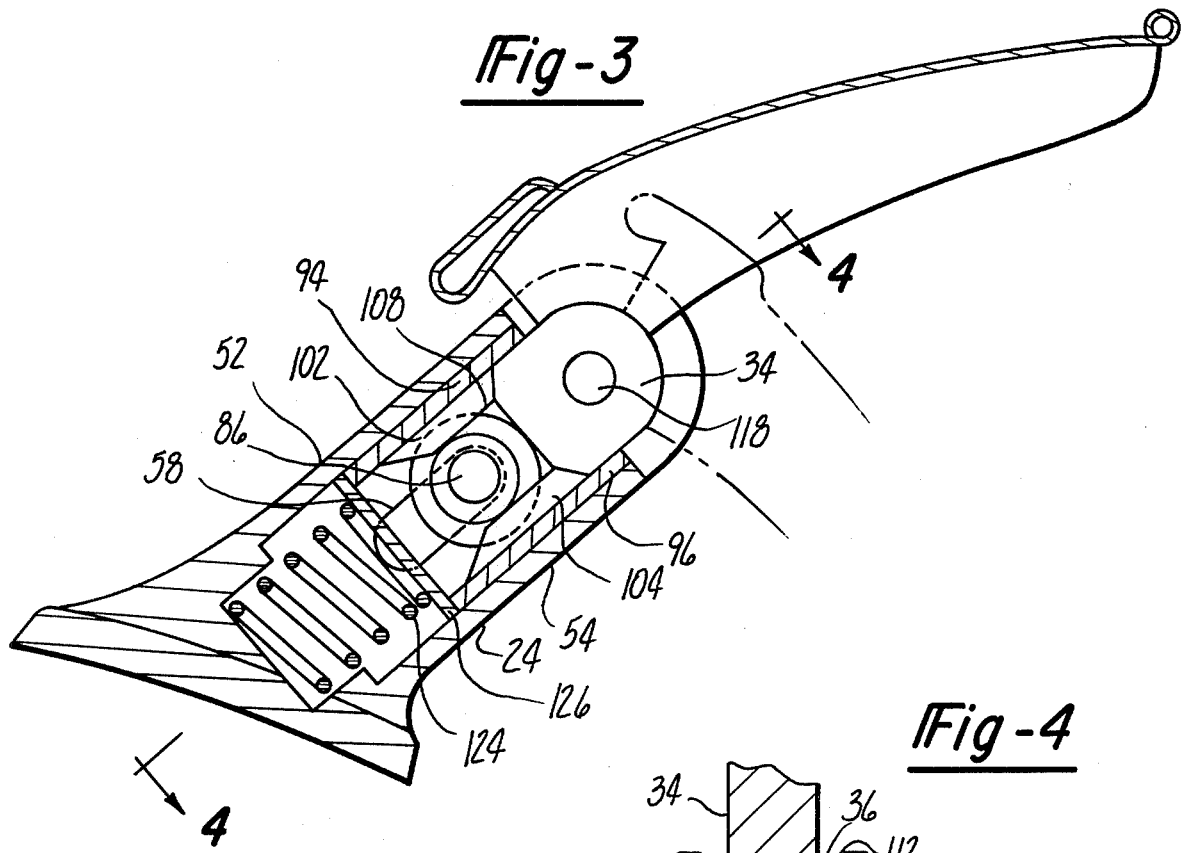
FIG. 3 is a cross-sectional view taken along the line 3—3 of FIG. 1, showing the deflector blade locked in a horizontal plane.

Now, and with reference to the drawing, and particularly FIG. 1, there is depicted therein a vehicle 10 having a luggage rack or carrier 12 secured to the roof 14 of the vehicle. The rack 12 comprises a bed 16, a pair of opposed side rails 18 (only one of which is shown) and a rear air deflector in accordance with the present invention and, generally, denoted at 20.

The deflector of deflector assembly 20 is velocity sensitive as contemplated by the present invention.

The deflector hereof, generally, comprises (a) an air deflector blade 22, (b) a stanchion 24 having the blade pivotally mounted thereto, and (c) means, generally, denoted at 26 for rendering the blade locked in position or velocity sensitive or responsive.

With more particularly, the deflector blade 22 comprises an elongate member having a width substantially equal to that of the width of the vehicle. The blade 22 has an upper edge 28 and a lower edge 30. The blade 22 is configured and constructed such that it is weighted or biassed toward the lower edge 30. In this manner the blade 22 normally tends to a vertical position or plane. The medial section of the blade 22 is provided with an arcuate ridge 32 which extends from the lower edge of the upper edge. The ridge 32 includes an enlarged cam 34 integrally formed therewith and disposed at the upper edge. The cam 34 has a central aperture 36 formed therethrough for pivotal mounting of the blade. The cam 34 has a pair of opposed shoulders 38, 40. The shoulders 38, 40 define stops for limiting movement of the blade 22 between the vertical plane and a horizontal position or plane, in a manner to be described subsequently.

The medial portion of the deflector blade 22 is pivotally mounted to the stanchion 24. The stanchion 24 has a base 26, which is secured to the roof 14 of the vehicle proximate the rear end thereof. Suitable fastening means, such as threaded fasteners 44 or the like extend through apertures formed in the base 42 of the stanchion 24 and are interconnected to the roof of the vehicle.

Integrally formed with the base and extending arcuately upwardly therefrom is the stanchion housing 46. The housing 46 comprises a pair of spaced apart side walls 48, 50 and a pair of opposed, spaced apart enclosure walls 52, 54. The enclosure walls are integrally formed with the side walls but have a height less than that of the side walls. This difference in height defines a slotted opening 56 permitting access into the interior of the housing 46.

As clearly shown in FIG. 2 hereof, the side walls 48, 50 each has an elongate, longitudinally extending slot 58, 60, respectively. The slots are aligned, similar, coaxial and equally dimensioned. Also, formed in each side wall is an aperture 62, 64. The apertures are in registry and equal in configuration and dimension. The apertures 62, 64 are formed in their respective side walls above the upper end of the enclosure walls 52, 54, as shown.

Associated with the stanchion 24 is the means 26 for rendering the blade either locked in position or velocity responsive. The components of the means 26 are clearly depicted in FIG. 2 hereof.

The locking mechanism generally comprises a pushbutton assembly, generally denoted at 66. The pushbutton assembly is actuable or operable to move a channel member between first and second positions. The channel member, when in a first position, locks the blade in either a horizontal or vertical plane or position. The channel member, when emplaced or positioned in its second position, renders the blade velocity responsive.

The means 26 further comprises the channel member 68, which is slideably mounted to the pushbutton assembly in a manner to be described subsequently. The means 26, also, comprises a wedging member 70 employed for guiding and restraining the pushbutton assembly.

Figure 4:
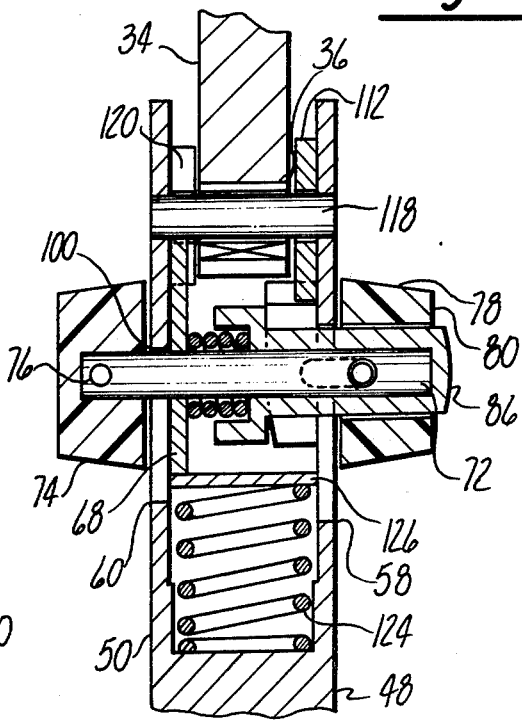
FIG. 4 is a cross-sectional view taken along line 4—4 of FIG. 3.

With more particularity, the pushbutton assembly hereof comprises a shaft 72 which extends through the slots 58, 60. The ends of the shaft 72 extend laterally beyond the slots. A cap 74 is mounted onto one end of the shaft 72 and is fixed thereto via a set screw 76 or similar member, such as a pin or the like. Journalled onto the opposite end of the shaft 72 is another cap 78. The cap 78 is distinct from the cap 74 in that the cap 78 has a central bore 80 formed therethrough. The bore 80 defines a channel or guide for a spool 82. The spool 82 defines a pushbutton for rendering operable or moveable the means 26 hereof. As shown in FIGS. 4 and 6, the cap 78 is journalled onto its associated end of the shaft 72 and maintained in position via a pin 83.

The pin 83 extends through a suitable opening formed in the cap 78 and is rendered in abutting relationship with the shaft 72, as shown.

As shown most clearly in FIGS. 2, 4 and 6, the spool is provided with a longitudinally extending slot 84. The slot 84 has its termini abut against the pin 82 to define and limit the path of travel of the spool 82. The spool 82, per se, comprises an elongated conduit 85 having a closed end cap 86. Integrally formed with the conduit 85 at the end opposite the cap 86 is an enlarged substantially cylindrical cup 88. The cup has a substantially circular side wall 90 and a base 92, which is integral with the conduit 85. The spool 82 is journalled onto the shaft 72 such that the end cap 86 extends laterally exteriorly of the associated slot 58. An opening is formed in the conduit which permits the spool 82 to pass therethrough into the slot 84 formed on the shaft 72. Biassing means, such as coil spring 94 is mounted on the shaft 72 and has one end thereof seating within the cup 88.

Mounted within the interior of the housing and on the shaft 72 in opposed relationship to the spool is the channel member 68. The channel member 68 comprises a substantially U-shaped member having opposite parallel legs 94, 96 and an interconnecting bight section 98, the legs and bight section being substantially perpendicular to each other as shown. The bight section has an aperture 100 formed therein. The shaft 72 extends through the aperture 100 to mount the channel member thereonto. It is to be appreciated that as the shaft is moved within the slots 58, 60, this causes a concomitant motion of the channel member 68. The opposite end of the spring 94 seats against the bight section 98 of the channel member 68. In this manner the spring normally is biased against the bottom or base of the cup 88 to urge the spool exteriorly of the housing.

As shown in FIGS. 4 and 6, the bight section 98 of the channel member 68 abuts against the side wall 50 and is slideable therealong. Again, the spring 94 urges and biases the channel member into engagement with the associated side wall.

Disposed on the interior of the side wall 48 and substantially along the same longitudinal axis as the slot 58 is the wedging member or body 70. The wedging member or body comprises a pair of spaced apart guide rails 102, 104. The lower or free ends of the guide rails have chamfered, diverging ends 106. The volume between the interior opposed surfaces of the guide rails defines a track or channel 108. The chamfered ends 106 define a flared entrance way into the channel 108. The channel 108 has a dimension or diameter substantially equal to that of the conduit or sleeve 84. The side walls of the rails 102, 104 have a slight taper 110 which defines a riding surface to facilitate movement of the base 92 of the cup 88 therealong.

The rails 102, 104 carry a spacer or a washer 112. The spacer of washer 112 is integrally formed with the rails. The washer 112 is a solid member integrally formed with the rails and has a side wall 114 having a height substantially less than that of the rails. The washer 112 has an aperture 116 formed therethrough. The wedging member 70 is mounted within the interior of the housing via the aperture 116 in a manner to be described hereinafter.

The cam 34 is rotatably mounted to the stanchion 24 through the aperture 36. A pivot pin 118 extends through the opposed registering apertures 62 and 64. The cam is mounted onto the pivot pin 118 within the opening 56. The washer 112 is interposed between the cam and the interior side wall 48 with the pivot pin 118 extending through the aperture 116 thereof.

A washer or spacer 120 is disposed on the opposite side of the cam and is mounted between the interior of the side wall 50 and the opposite side of the cam, as noted. A tensioning means, such as a leaf spring 122, is wedged between the two washers 112, 120 and winds about a portion of the pivot pin 118 to impart tension to the cam 34.

Biasing means, such as a coil spring 124, is disposed within the interior of the housing at the base thereof. A spacer 126 traverses the interior of the housing and is interposed the upper or free end of the spring 124 and the bottom of the channel member 68. In this manner, any forces imparted by the spring 124 to the spacer 126 are translated to the channel member. The coil spring 124 normally urges the channel member towards the top of the housing.

It is to be appreciated that in accordance with the present invention, the pushbutton mechanism is moveable along the extent of the slot. When the assembly is in the lower or second position, the spool is locked in position against the wedging member at the diverging ends 106 thereof by the forces exerted by the spring 94 against the base of the cup 88. The spool cannot move in the track 108 because the diameter of the cup is greater than the width of the track. When in this upper or first position, the channel member is in its upper or locking position and engages either of the shoulders 38 or 40 to lock the deflector blade in a pre-selected position.

When the pushbutton assembly is translated or moved to the lower termini of the slots or the second position thereof, the channel member is, likewise, in its lower or second position. In the second position the spool and its associated cup is out of contact with the wedging member and is urged against the interior of the side wall 48 associated therewith, at the base of the wedging member at the diverging ends thereof.

In accordance with the present invention, when the channel member is in its first position, it locks the deflector blade 22 in either a horizontal or vertical position. When the channel member is in its lower or second position, the deflector blade is rotatable freely between a vertical and horizontal plane and is thereby rendered velocity responsive or sensitive. These conditions or modes are more clearly understood from a reference to FIGS. 3-8 hereof.

Figure 7:
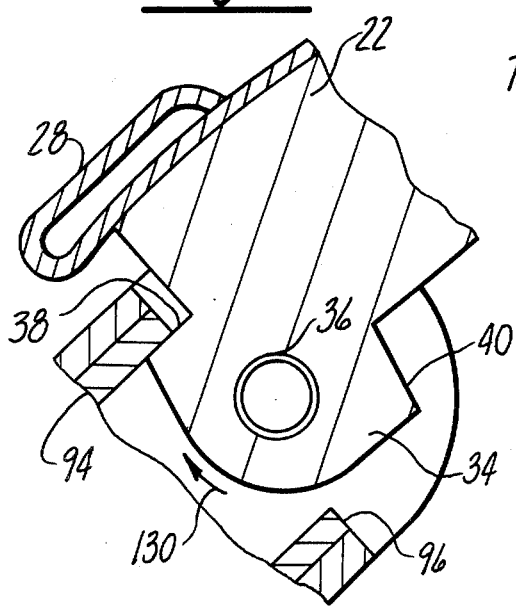
FIG. 7 is an enlarged, fragmentary view of a deflector blade locked in a horizontal plane.

In FIGS. 3, 4, 7 and 8, the channel member is shown in its first or locking position. In accordance herewith and to render the channel member in its first position, the end cap of the spool is depressed against the normal forces emerging from the biassing means 94 to force the cup towards the opposite side wall. Concomitantly, the cup is moved upwardly such that it rides along the taper 110 and comes to rest against the guide rails 102, 104. Because of the dimensioning of the channel 108, the spool nests thereagainst. The junction between a washer 112 and the guide rails 102, 104 cooperates with the upper ends of the slots 58, 60 to define a stop 128 for limiting the upward movement of the spool. The engagement between the slot 84 and the pin 83 limits the inward depression of the spool. As shown in FIG. 4, when the pushbutton assembly is placed in the first or locking position, the biassing means 94 urges the base of the cup against the wedging member to hold the channel member in its upper or first or locking position. This movement is facilitated by the action of the biassing means 124 against the spacer 126 which forces the spool and channel member to the top of the slots. As noted, in the upper or locking position, the channel member is operable to lock the deflector blade in either a horizontal or vertical plane. This is achieved by rotating the deflector blade about the pivot pin 118 to either the horizontal or vertical plane. Assuming a horizontal positioning of the blade 22, then the locking action is depicted in FIG. 7 hereof. As shown in FIG. 7, the interior surface of the leg or member 94 engages and contacts the shoulder 38 of the cam 34. Because of the weighting of the blade 22, there is a momentary force in the direction of the arrow 130. However, because of the interengagement between the shoulder 38 and the leg 94, no motion can be imparted to the leg 22 thereby locking the blade in the horizontal plane.

Referring to FIG. 8, there is shown the vertical plane locking mode hereof. Herein, the shoulder 40 of the cam 34 abuts and engages the interior surface of the leg 96 of the channel member 68. Because of the weighting imparted to the blade, this is the normal locking position of the deflector blade. The only manner by which the deflector blade would be urged to disengagement from the position shown would be by the forces of air impinging against the under surface of the deflector blade. In such instance, the momentary forces created would be those shown in the direction of the arrow 132. However, because of the interengagement between the shoulder 40 and the interior surface of the leg 96, the lifting effect is negated thereby locking the deflector blade in the position shown.

In FIGS. 5 and 6, there is shown or depicted the second position of the channel member thereby rendering the deflector blade in its air velocity responsive mode. In this mode, the deflector blade 22 is free to move between a vertical position and a horizontal position, as indicated by the arrow 134. As noted, the blade 22 is normally weighted toward the vertical position. However, and in accordance herewith, as the air currents passing by the blade create a lifting effect to the under surface thereof against the normal bias, the blade is free to rotate above the pivot pin 118 to the horizontal plane. The upper end of the blade limits the degree of rotation by its engagement with the upper end of the enclosing wall 52. In the air velocity responsive mode, the pushbutton assembly is positioned towards the lower termini of the slots 58, 60. In this position, the biassing means 94 acts against the base 92 of the cup 88 to urge the base into engagement with the associated side wall 48 and which is held captive against the ends 106 of the rails 102, 104 by the upward urging of the biassing means 124. This action urges the spool laterally exteriorly of the housing through the bore 80 and against the wedging member. The degree of urging is limited upon the contact between the base 92 and the interior side wall, as well as the engagement between the slot 84 and the pin 83. To attain this lower position from the locked or upper position, the end of the spool is depressed. Concomitantly the caps are engaged and pulled downwardly to disengage the cup from the wedging member and against the normal bias of the coil spring 124. It should be noted with respect hereto that as the spool is urged downwardly, the cup automatically positions itself between the rails when depressed sufficiently to clear the incline of the rails. The biassing means 94, thus, exerts sufficient pressure against the cup 88 to ensure contact with the wedging member. Once the spool has been drawn down sufficiently past the wedging member, the biassing means 94 cooperates with the biassing means 124 and spacer 126 to urge the cup and, therefore, the spool into engagement with the side wall 48 and wedges 102, 104 thereby locking the spool in the air velocity responsive mode.

It should be noted with respect hereto that the cam is locked to the pivot means 118, a set screw or similar fastening member 130 which threadably extends through a transverse opening 132 formed in the cam.

Referring again to the drawing, and in particular FIG. 1 hereof, the outboard of outer ends of the deflector blade 22 are provided with laterally outwardly extending pivot pins 140 (only one of which is shown). The pivot pins project into suitable seats 142 formed in mounting brackets 144. The pivot pins 140 permit the deflector blade to be rotated between its various modes, as herein described.

In practicing the present invention, the materials of construction do impart some considerable influence. For example, because of the normal disposition and deployment of the present invention, the materials must be resistant to various environmental conditions. Thus, optimally, some of the components are formed from suitable synthetic resinous materials. For example, the spool, the cap and similar members are formed from nylon or similar plastics. The wedging member is, preferably, formed from a zinc casting. The channel member, as well as the biassing springs are, preferably, formed from steel alloy or similar material.

It will be appreciated from the preceding that there has been described herein an air deflector for a luggage rack having a locking assembly associated therewith which permits the deflector blade to be air velocity responsive or to be locked in position. Thus, the assembly hereof enables all the advantages of the air deflector blades to be still realized while overcoming the questions of drag being created.

It should be noted with respect hereto that the assembly hereof can be subjected to modifications. For example, a stanchion having the locking assembly hereof can be disposed at each end of the deflector blade in lieu of the central stanchion described hereinabove. Alternatively, only one end stanchion having the locking means incorporated therewith could be deployed. Both situations eliminate the central stanchion.

Furthermore, and as noted hereinabove, the deflector hereof can be mounted to the roof of a vehicle independently of a luggage rack.

Having, thus, described the invention what is claimed is:

1. In a luggage carrier of the type comprising an air deflector blade, the improvement which comprises:
   means for rendering the deflector blade rotatable between a substantially vertical position and a substantially horizontal position in response to the velocity of air flowing therepast, the blade being rotatable from the vertical position to horizontal position as the velocity of the air impinging thereagainst increases, the blade being adapted to minimize the drag created thereby.

2. The improvement of claim 1 wherein the means for rendering the deflector blade rotatable comprises:
   (a) a housing,
   (b) means for pivotally mounting the deflector blade to the housing, 3. The improvement of claim 2 wherein:
   the blade is locked in position by the engagement of the means for locking with a cam associated with the housing.

4. The improvement of claim 3 which further comprises:
   means for moving the locking means between a first position into engagement with the cam and a second position out of engagement with the cam, the deflector blade being rotatable when the means for locking is in the second position.

5. The improvement of claim 3 which further comprises:
   (a) a channel member disposed in the housing,
   (b) means for moving the channel member between a first position and a second position, the channel member engaging the cam when in the first position and being remote from the cam when in the second position, the channel member comprising the means for locking the blade in the horizontal position and the means for locking the blade in the vertical position.

6. The improvement of claim 1 which further comprises:
   (a) means for locking the deflector blade in the substantially horizontal position, and
   (b) means for locking the deflector blade in the substantially vertical position.

7. The improvement of claim 6 which further comprises:
   (a) a channel member disposed in the housing,
   (b) means for moving the channel member between a first position and a second position, the channel member engaging the deflector blade when in the first position and being remote from the deflector blade when in the second position, the channel member comprising the means for locking the deflector blade in the horizontal position and the vertical position.

8. The improvement of claim 7 which further comprises:
   (a) a wedging member disposed in the housing and opposed to the channel member,
   (b) a spool associated with the channel member and moveable therewith, and wherein the spool is engaged by the wedging member when the channel member is in the second position to retain the channel member thereat.

9. The improvement of claim 7 which further comprises:
   biassing means urging the channel member toward the first position.

10. In combination with an automotive vehicle, a luggage carrier comprising:
    (a) an air deflector blade normally disposed in a vertical plane and extending downwardly over the rear of the vehicle, (b) means for locking the deflector blade in a horizontal position, and
(c) means for locking the deflector blade in a vertical position.

11. The combination of claim 10 which further comprises:

means for rendering the deflector blade rotatable between a substantially vertical position and a substantially horizontal position in response to the velocity of air flowing therepast, the blade rotating from the vertical position to the horizontal position as the velocity of a vehicle increases.

12. The combination of claim 10 wherein the means for rendering the deflector blade rotatable comprises:
(a) a housing,
(b) means for pivotally mounting the deflector blade to the housing,
(c) a cam formed on the blade, and having a mounting aperture formed therein, the pivotal mounting means extending through the mounting aperture, and
wherein the blade is pivotable about the means for pivotally mounting.

13. The combination of claim 12 wherein:
the blade is locked in position by the engagement of the means for locking with the cam.

14. The combination of claim 13 which further comprises:
means for moving each of the locking means between a first position into engagement with the cam and a second position out of engagement with the cam, the deflector blade being rotatable when the means for locking are in their, respective, second positions.

15. The combination of claim 13 which further comprises:
(a) a channel member disposed in the housing,
(b) means for moving the channel member between a first position and a second position, the channel member engaging the cam when in the first position and being remote from the cam when in the second position, channel member comprising the means for locking the blade in the horizontal position and the means for locking the blade in the vertical position.

16. The combination of claim 10 which further comprises:
(a) a channel member disposed in the housing,
(b) means for moving the channel member between a first position and a second position, the channel member engaging the deflector blade when in the first position and being remote from the deflector blade when in the second position, the channel member comprising the means for locking the deflector blade in the horizontal position and the vertical position.

17. The combination of claim 16 which further comprises:
(a) a wedging member disposed in the housing and opposed to the channel member,
(b) a spool associated with the channel member and moveable therewith, and
wherein the spool is engaged by the wedging member when the channel member is in the second position to retain the channel member thereat.

18. The combination of claim 16 which further comprises:
biassing means urging the channel member toward the first position.

19. An air deflector assembly for normally directing a stream of air across the backlight of a land vehicle, comprising:
(a) an air deflector blade,
(b) means for rendering the blade rotatable between a substantially vertical position and a substantially horizontal position in response to the velocity of air flowing therepast, such that when the assembly is mounted onto a vehicle the blade rotates from the vertical position to the horizontal position as the velocity of the vehicle increases to minimize the drag created thereby.

20. The air deflector assembly of claim 19 which further comprises:
(a) means for locking the blade in the horizontal position, and
(b) means for locking the deflector blade in the vertical position.

21. The assembly of claim 19 wherein the means for rendering the deflector blade rotatable comprises:
(a) a housing,
(b) means for pivotally mounting the deflector blade to the housing,
(c) a cam formed on the blade, and having a mounting aperture formed therein, the pivotal mounting means extending through the mounting aperture, and
wherein the blade is pivotable about the means for pivotally mounting.

22. The assembly of claim 21 which further comprises:
(a) means for locking the deflector blade in a horizontal position disposed in the housing,
(b) means for locking the deflector blade in a vertical position disposed in the housing, and
wherein the blade is locked in position by the engagement of the means for locking with the cam.

23. The assembly of claim 22 which further comprises:
means for moving each of the locking means between a first position into engagement with the cam and a second position out of engagement with the cam, the deflector blade being rotatable when the means for locking are in their, respective, second positions.

24. The assembly of claim 22 which further comprises:
(a) a channel member disposed in the housing,
(b) means for moving the channel member between a first position and a second position, the channel member engaging the cam when in the first position and being remote from the channel member comprising the means for locking the blade in the horizontal position and the means for locking the blade in the vertical position.

25. The assembly of claim 20 which further comprises:
(a) a channel member disposed in the housing,
(b) means for moving the channel member between a first position and a second position, the channel member engaging the deflector blade when in the first position and being remote from the deflector blade when in the second position, the channel member comprising the means for locking the deflector blade in the horizontal position and the vertical position.

26. The assembly of claim 25 which further comprises:
(a) a wedging member disposed in the housing and opposed to the channel member,
(b) a spool associated with the channel member and moveable therewith, and
wherein the spool is engaged by the wedging member when the channel member is in the second position to retain the channel member thereat.

27. The assembly of claim 25 which further comprises:
biassing means urging the channel member toward the first position.

* * * * *

Disclaimer 4,179,154.—*Charles E. Ingram,* Warren, Mich. AIR VELOCITY RESPONSIVE DEFLECTOR. Patent dated Dec. 18, 1979. Disclaimer filed Mar. 16, 1983, by the assignee, *Four Star Corp.*

Hereby enters this disclaimer to claims 1 and 2 of said patent.
[*Official Gazette June 7, 1983.*]